B. HARRINGTON & A. W. CLARKE.
LOCK FOR MOTOR VEHICLE STEERING WHEELS.
APPLICATION FILED SEPT. 21, 1916.
1,266,015.
Patented May 14, 1918.
2 SHEETS—SHEET 1.
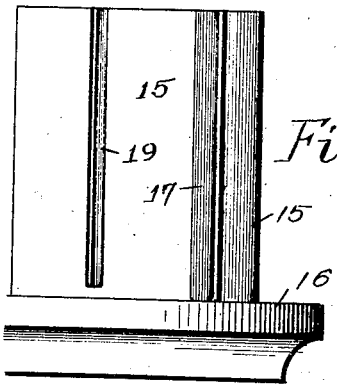
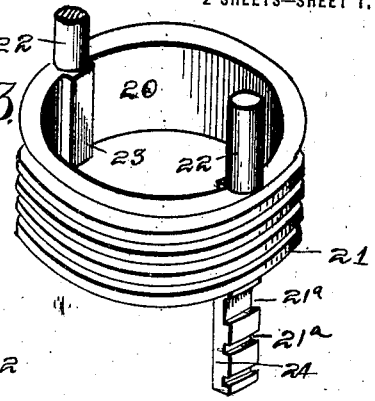
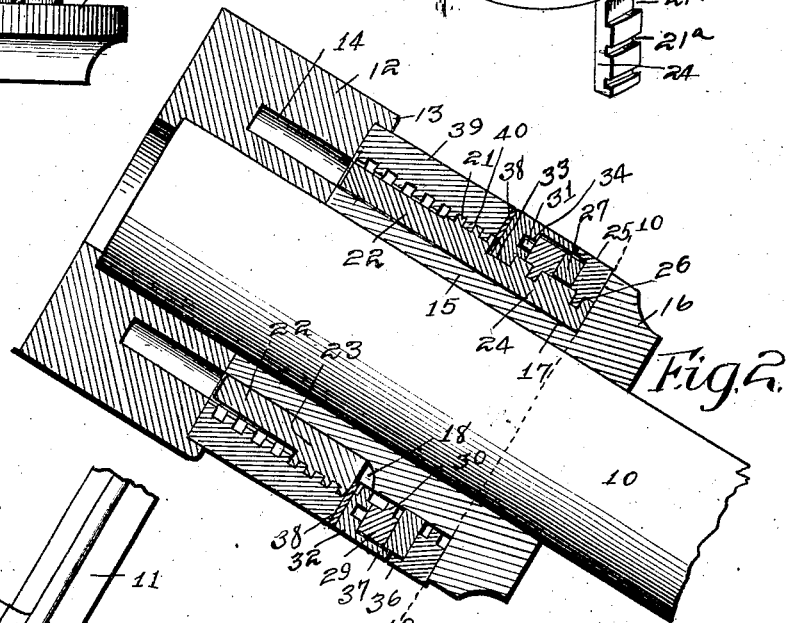
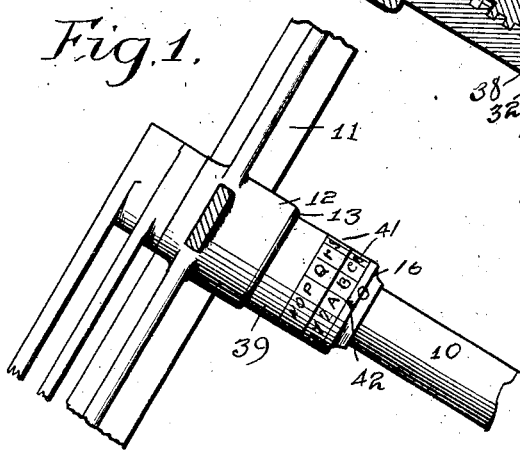
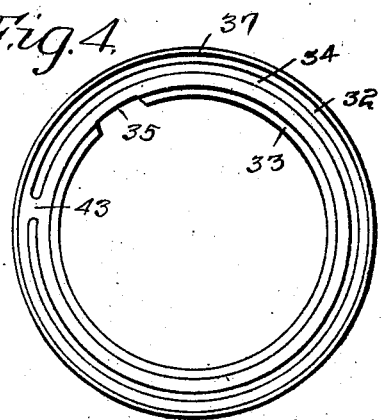
Witness
A. J. Hague
Inventors
Bert Harrington
Adam W. Clarke
by Orwig & Bair attys

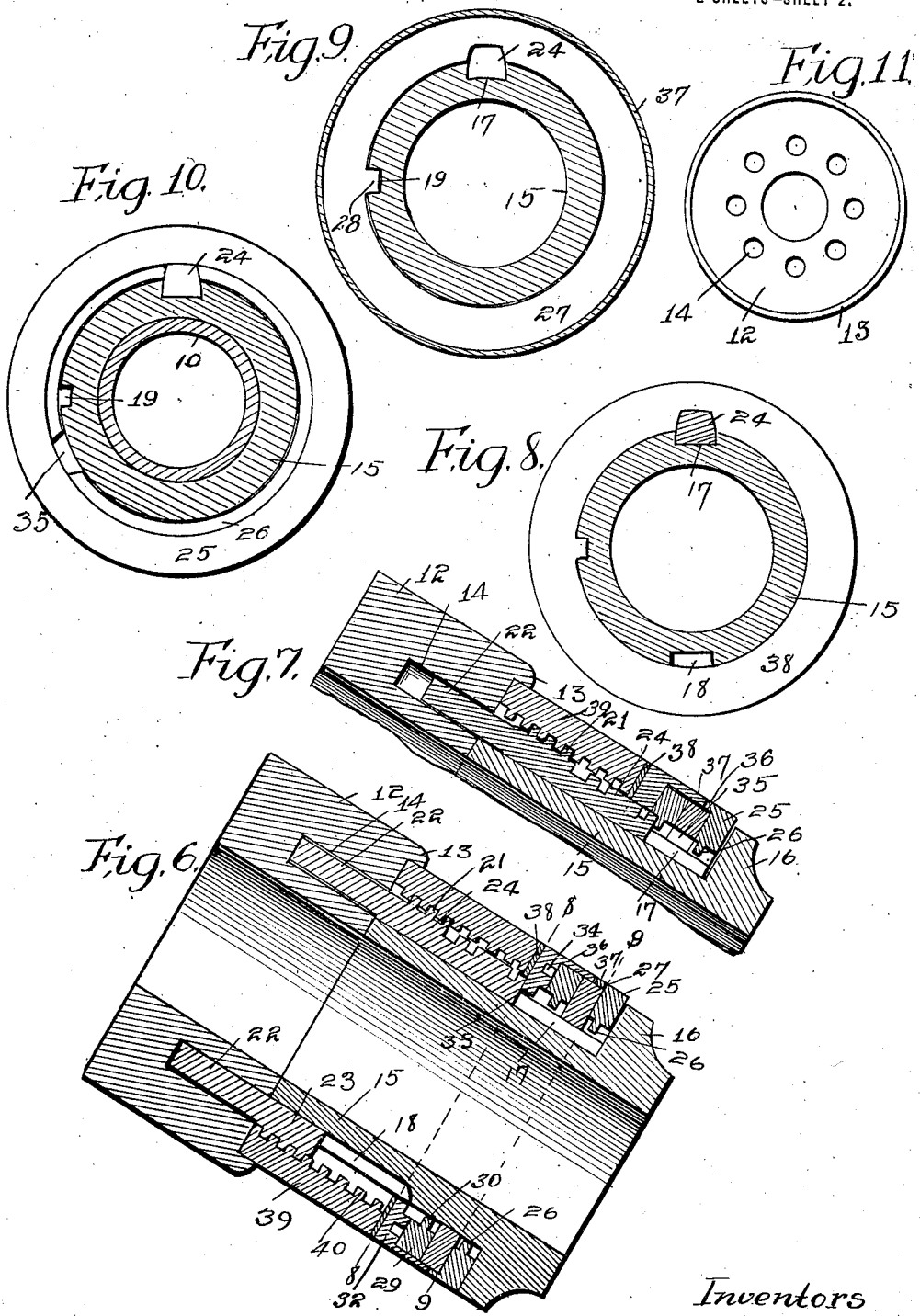

UNITED STATES PATENT OFFICE.

BERT HARRINGTON AND ADAM W. CLARKE, OF DES MOINES, IOWA.

LOCK FOR MOTOR-VEHICLE STEERING-WHEELS.

1,266,015.  Specification of Letters Patent.  Patented May 14, 1918.

Application filed September 21, 1916. Serial No. 121,458.

*To all whom it may concern:*

Be it known that we, BERT HARRINGTON and ADAM W. CLARKE, citizens of the United States, and residents of Des Moines, in the county of Polk and State of Iowa, have invented a certain new and useful Lock for Motor-Vehicle Steering-Wheels, of which the following is a specification.

The object of our invention is to provide a lock of simple, durable and inexpensive construction, for automobile steering wheels.

A further object is to provide a lock of the kind mentioned, adapted to be used in connection with an automobile steering wheel, and having parts adapted to coact with parts of the steering wheel, whereby the wheel may be locked against any movement.

Still a further object is to provide such a lock of a combination type, and so constructed and arranged that no key or separate part such as would be likely to be lost or mislaid, is necessary for the operation of the lock.

A further object is to provide such a lock in combination with a steering wheel, having the parts so constructed and arranged that the steering wheel can be locked in different positions for locking the front wheels of the motor vehicle in different positions.
Still a further object is to provide such a lock so constructed and arranged that the interior parts thereof are very difficult of access.

A further object is to provide such a lock so constructed and mounted on the vehicle as not to detract from the appearance of such vehicle.

Our invention consists in the construction, arrangement and combination of the various parts of the device, whereby the objects contemplated are attained, as hereinafter more fully set forth, pointed out in our claim, and illustrated in the accompanying drawings, in which:
Figure 1 shows a side elevation of a portion of the steering wheel shown, equipped with a lock embodying our invention.

Fig. 2 shows an enlarged, central, vertical, sectional view through the locking mechanism.

Fig. 3 shows a perspective, detail view of the locking member which carries the bolts.

Fig. 4 is an inverted plan view of the upper combination locking ring.
Fig. 5 shows a side elevation of a portion of the fixed supporting member for the lock parts.

Fig. 6 shows a vertical, sectional view through the locking device, with the locking bolts in operative position.

Fig. 7 shows a vertical sectional view of a portion of the locking parts in another of their positions.

Fig. 8 shows a detail sectional view, taken on the line 8—8 of Fig. 6.

Fig. 9 shows a detail, sectional view, taken on the line 9—9 of Fig. 6.

Fig. 10 shows a detail sectional view, taken on the line 10—10 of Fig. 2, and

Fig. 11 shows an inverted, plan view of the wheel head.

In the accompanying drawings we have used the reference numeral 10 to indicate generally the fixed steering post of a motor vehicle, on the upper end of which is rotatably mounted a steering wheel 11 having a central hub member which we will call the head 12. The head 12 has an annular peripheral flange 13 extending downwardly, for purposes hereinafter more fully explained. In the under surface of the head 12 and arranged in a circle between the flange 13 and the steering post 10, are a plurality of openings 14 projecting upwardly into the head 12, preferably arranged in opposite pairs.

Mounted on the steering post below the head 12 and fixed to the steering post, is a locking device member comprising a cylinder 15 which should be fixed with relation to the vehicle frame, the upper end of which engages the under surface of the head 12. The cylinder 15 preferably fits snugly on the steering post 10. At its lower end the cylinder 15 is provided with an annular, outwardly extending flange 16, clearly shown for instance in Figs. 2 and 6. The cylinder 15 has in its outer surface a pair of opposite grooves, one of which extends the entire length of the cylinder 15, and the other of which is shorter. The longer groove we have indicated by the reference character 17 and the shorter groove by the reference numeral 18. The outer surface of the cylinder 15 is also provided with a longitudinal groove 19 extending from its upper end to a point near the flange 16.

Slidably mounted upon the cylinder 15 is an annular band or ring 20, having in its outer surface a spiral thread 21. Projecting upwardly from opposite sides of the ring 20 are locking bolts 22 adapted to be slid into the openings 14 for locking the band 20 to the wheel head 12.

Formed on the inner surface of the band 20 are opposite ribs 23 arranged below the respective locking bolts 22. Extending downwardly below one of the ribs 23 is a locking bar 24, the outer surface of which is flush with the outer surface of the ring 20 and provided with transverse grooves 21ª similar to the screw thread 21. The length of the locking bolts 22 and the locking bar 24 is such that when the lower end of the bar 24 rests against the flange 16, the upper ends of the locking bolts 22 are flush with the upper surface of the cylinder 15.

Rotatably mounted on the lower end of the cylinder 15 is an annular ring 25 which is one of a plurality of rings which we will call the combination locking rings. Each of said rings has on its interior a central, annular, inwardly extending flange 26. It will be noted that there is thus formed above and below the flange 26 a rabbet for leaving an open space above and below the flange 26 between the main body of the ring 25 and the cylinder 15.

Mounted on the cylinder 15 above the locking ring 25 is a ring 27 preferably of somewhat smaller diameter than the ring 25 and so arranged as to permit the free rotation of the ring 25. The ring 27 has a lug 28 extending inwardly into the groove 19 in the cylinder 15, whereby the ring 27 is held against rotation.

Rotatably mounted on the cylinder 15 above the ring 27 is a ring 29, the ring 29 having on its inner surface a central, annular, inwardly extending flange 30, arranged to snugly fit the cylinder 15. It will be seen that the ring 29 thus has rabbets or grooves formed above and below the flange 30. Extending upwardly from the ring 29 is a pin 31. The ring 29 is of substantially the same diameter as the ring 27.

Rotatably mounted on the cylinder 15 above the ring 29 is another combination locking ring 32, having on its inner surface an inwardly extending annular flange 33 extending from a point flush with its upper surface to a point spaced from its lower surface. In the lower surface of the combination locking ring 32 is a groove 34 extending almost entirely around said ring, as clearly shown in Fig. 4.

All of the rings hereinbefore described are provided on their inner surfaces with vertical notches 35, so arranged that the rings may be brought to position where all of said notches are in alinement and register with the groove 17 in the outer surface of the cylinder 15. The rings 25 and 32 are preferably provided with peripheral, upwardly and downwardly extending flanges 36 and 37 respectively, which cover the rings 27 and 29, the dividing line between the flanges 36 and 37 being over the stationary ring 27.

Mounted on the cylinder 15 above the ring 32 is a ring 38, similar in its construction and the manner in which it is mounted, to the ring 27.

Mounted on the cylinder 15 above the ring 38 is a rotatable sleeve 39 provided on its interior with a spiral screw thread 40 to co-act with the thread 21. It will be seen that the sleeve 39 is held against sliding movement by the head 12 and by the parts heretofore described, and that when said sleeve 39 is rotated the ring 20 will be moved upwardly or downwardly, depending upon the direction of rotation of the sleeve 39. When the various rings hereinbefore described are rotated to position where the notches 35 are in line with each other and in register with the groove 17, the ring 20 may be moved upwardly or downwardly to the extreme limits of its movement. The upper groove 21ª is wider than the lower grooves 21ª in order that it may freely receive the flange 33. When the notches 35 are in alinement with each other and in register with the groove 17, and the ring 20 is in its lower position, then the rotation of the ring 25 or the ring 32 will cause the flange 26 or the flange 33, as the case may be, to enter one of the lower grooves 21ª or the upper wide groove 21ª, whereby the ring 20 is locked against any sliding movement.

In this connection attention is called to the fact that the rings 25 and 32 are provided on their outer surfaces with indicating characters 41, such as numbers or letters or the like, and the flange 16 is provided with at least one indicating mark 42 or the like. Assuming that both the rings 25 and 32 have been moved as last described, and that the ring 32 is moved farther for causing the solid portion 43 between the ends of the groove 34 to engage the pin 31 and move the ring 29, then the flange 30 will enter one of the grooves 21ª.

It will be seen when the parts are in the position last mentioned, how difficult it would be for anyone who did not know the combination to work our improved lock. By moving the parts as just described it will be seen that when the lock is not in use the combination locking rings may be moved to such position that there is no danger of strangers accidentally learning the combination.

Assume now that it is desired to move the locking rings to position for permitting the ring 20 to be moved upwardly for locking the steering wheel head. The ring 25 is rotated until the proper character 41 thereon is opposite the character 42, whereupon the notch 35 of the ring 25 will be opposite the notch 17 and the lower groove 21ª. The ring 32 is then rotated in the proper direction until the pin 31 is engaged by the solid portion 43 and the ring 29 rotated until the proper indicating character on the ring 32 is opposite the character 42, whereupon the notch 35 of the ring 29 will be opposite the groove 17. Thereupon the ring 32 is rotated in the opposite direction until the proper character thereon is opposite the character 42, at which time the notch 35 in the ring 32 will be opposite the groove 17. The rings then being in proper position the sleeve 39 may be rotated for moving the ring 20 upwardly.

The openings 14 are so arranged that when the front wheels of the vehicle are headed directly forward, two of the opposite openings 14 will be exactly above the grooves 17 and 18 and above the locking bolts 22. Other openings 14 are so arranged that when the steering wheel is moved to different positions for moving the front wheels of the vehicle in different positions, certain pairs of the openings 14 will be above the locking bolts so that the wheels of the vehicle may be locked in a variety of positions.

Assuming that the steering wheel is in any of its positions where openings 14 are directly above the locking bolts, then when the sleeve 39 is rotated the ring 20 will be moved upwardly and the locking bolts 22 will enter the openings 14. When the ring 20 has been moved to its upper limit of movement, the ring 32 or the ring 25 may be rotated. The parts are so proportioned that when the ring 20 is in its upper position and the ring 32 is rotated, the flange 33 on said ring will rest immediately below the lower edge of the ring 20.

For unlocking the device the user must again rotate the rings as hereinbefore described, to the proper positions for bringing the notches 35 into line with each other and with the groove 17, whereupon the sleeve 39 may be rotated for moving the ring 20 downwardly and withdrawing the locking bolts 22 from the openings 14.

Attention is called to some of the advantages of our improved locking device. It has already been mentioned that the front wheels of the car may be locked in a variety of positions. On account of the construction and arrangement of the various combination locking rings and the parts connected therewith, it will be seen that it would be extremely difficult to work the lock without knowing the combination. For instance, if a person desiring to tamper with the car should rotate the ring 32 until the notch 35 therein should be below the locking bar 24, then it would be possible to rotate the sleeve 39 and also the ring 20 until the lower end of the locking bar 24 entered the notch 35 of the ring 32. Further downward movement of the locking bar, however, would be prevented by the flange 30 on the concealed wing 29, and it would be impossible to move the ring 20 farther toward unlocking position without first rotating the sleeve 39 for moving the ring 20 to its upper limit of movement and thereafter rotating the ring 32 to position for causing the solid portion 43 to engage the pin 31 for moving the ring 29 to position where the notch 35 of the ring 29 would be in register with the groove 17.

In Fig. 7 we have shown the parts in the position which they would assume if a person tampering with the machine should rotate the ring 32 to position where its notch would register with the groove 17 and would thereupon lower the locking bar to enter said notch 35. It is seen that the lower end of the locking bar would then engage the flange 30 of the concealed locking ring 29. At such a time in the operation of the machine it would be impossible to further rotate the upper locking ring 32. It would be absolutely impossible when the ring 20 is in its upper position to determine by sense of feeling or hearing when the concealed locking ring might be in position for unlocking the device. It will be seen that by varying the relative positions of the notches 35 with relation to the indicating characters 41 on the combination locking rings, and by varying the position of the pin 31 on the ring 29, an immense variety of combinations may be had.

On account of the use of the flanges 13, 36 and 37 the working parts are thoroughly concealed, so that it would be very difficult for a person desiring to tamper with a machine to determine where to begin to use a file or other tool for disturbing the lock. It would also be very difficult to employ a lever of any kind to any advantage for getting at the interior of the lock when it is once installed on the top.

The lock has no separate parts and is always ready for use when once installed. It can be placed on a car without detracting from the appearance thereof.

It is our intention to cover by this application and the patent to be issued thereon, any modified forms of structure or use of mechanical equivalents which may come within the reasonable scope of our claim.

We claim as our invention:

In an automobile steering wheel lock, the combination of a steering post, a wheel mounted thereon, having a hub provided with openings, a fixed cylindrical member mounted on said post, a cylinder slidably but non-rotatably mounted on said member having an upwardly extending locking bolt adapted to selectively enter said openings, and having a downwardly extending member, said cylinder and last described member being provided with external screwthreads, an internally screw-threaded collar or cylinder mounted on said externally screw-threaded cylinder, abutting against said hub at its upper edge, said fixed member having at its lower portion a shoulder having a groove for said downwardly extending member to travel in, locking rings superimposed on each other above said shoulder, and adapted to coact with said downwardly extending member for locking said cylinder in different positions, the parts being so arranged that said last collar is held against downward movement by said locking rings and said shoulder.

Des Moines, Iowa, September 12, 1916.

BERT HARRINGTON.
ADAM W. CLARKE.